(12) United States Patent
Rocca

(10) Patent No.: US 7,251,263 B2
(45) Date of Patent: Jul. 31, 2007

(54) CAPILLARY DISCHARGE X-RAY LASER

(75) Inventor: Jorge J. Rocca, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 147 days.

(21) Appl. No.: 11/136,617

(22) Filed: May 23, 2005

(65) Prior Publication Data
US 2006/0262825 A1    Nov. 23, 2006

(51) Int. Cl.
*H01S 3/22* (2006.01)
*H01S 3/095* (2006.01)

(52) U.S. Cl. .............................. 372/61; 372/55; 372/89
(58) Field of Classification Search .................... 372/4, 372/55, 61, 65, 87, 5
See application file for complete search history.

(56) References Cited

U.S. PATENT DOCUMENTS

| | | | | |
|---|---|---|---|---|
| 4,937,832 A | * | 6/1990 | Rocca | 372/5 |
| 5,185,552 A | * | 2/1993 | Suzuki et al. | 313/231.71 |
| 5,577,092 A | * | 11/1996 | Kublak et al. | 378/119 |
| 6,167,065 A | * | 12/2000 | Rocca | 372/5 |
| 6,172,324 B1 | * | 1/2001 | Birx | 219/121.57 |
| 6,337,543 B1 | * | 1/2002 | Ge | 315/227 R |
| 6,356,618 B1 | * | 3/2002 | Fornaciari et al. | 378/119 |
| 6,414,438 B1 | * | 7/2002 | Borisov et al. | 315/111.31 |
| 6,417,625 B1 | * | 7/2002 | Brooks et al. | 315/111.31 |
| 6,452,194 B2 | * | 9/2002 | Bijkerk et al. | 250/492.2 |
| 6,466,599 B1 | * | 10/2002 | Bragin et al. | 372/58 |
| 6,498,832 B2 | * | 12/2002 | Spence et al. | 378/119 |
| 6,563,907 B1 | * | 5/2003 | Kubiak et al. | 378/119 |
| 6,693,944 B1 | * | 2/2004 | Hug et al. | 372/88 |
| 7,034,322 B2 | * | 4/2006 | Bender | 250/504 R |
| 2002/0168049 A1 | * | 11/2002 | Schriever et al. | 378/119 |
| 2006/0232215 A1 | * | 10/2006 | Bogatu | 315/111.31 |

OTHER PUBLICATIONS

B.J. MACGowan et al., "Short wavelength x-ray laser research at the Lawrence Livermore National Laboratory." Physics of Fluids B, vol. 4, No. 7, pp. 2326-2337, American Institute of Physics (Jul. 1992).

(Continued)

*Primary Examiner*—Minsun Oh Harvey
*Assistant Examiner*—Phillip Nguyen
(74) *Attorney, Agent, or Firm*—Cochran Freund & Young LLC; Samuel M. Freund

(57) ABSTRACT

A compact, high repetition rate, extreme ultraviolet/soft x-ray laser and method for generating such radiation are described. Excitation of the gaseous or vaporous lasing medium is achieved by discharging energy stored in a solid-dielectric capacitive device through a capillary channel containing the medium. By reducing the inductance of the discharge apparatus, excitation of the laser medium can be achieved without the use of Marx generators. Neon-like Ar atom laser pulses at 46.9 nm having energies of about 13 μJ are generated at repetition rates up to 12 Hz. Between 2 and $3 \times 10^4$ laser shots can be generated using a single capillary. Such a source of intense, short-wavelength radiation can be used for applications which include surface characterization of materials, high resolution imaging and printing, photochemistry and photophysics, laser ablation, characterization of x-ray optics, and dense plasma diagnostics.

27 Claims, 6 Drawing Sheets

OTHER PUBLICATIONS

A. Carrillon et al., "Saturated and Near-Diffraction-Limited Operation of an XUV Laser at 23.6nm." Physical Review Letters, vol. 68, No. 19, pp. 2917-2920, The American Physiclal Society (May 11, 1992).

J.J. Rocca et al., "Demonstration of a Discharge Pumped Table-Top Soft-X-Ray Laser," Physical Review Letters, vol. 73, No. 16, pp. 2192-2195, The American Physiclal Society (Oct. 17, 1994).

J. Dunn et al., "Gain Saturation Regime for Laser-Driven Tabletop, Transient Ni-Like Ion X-Ray Lasers." Physical Review Letters, vol. 84, No. 21, pp. 4834-4837, The American Physiclal Society (May 22, 2000).

S. Sebban et al., "Saturated Amplification of a Collisionally Pumped Optical-Field-Ionization Soft X-Ray Laser at 41.8 nm." Physical Review Letters, vol. 86, No. 14, pp. 3004-3007, The American Physiclal Society (Apr. 2, 2001).

S. Sebban et al., "Demonstration of a Ni-Like Kr Optical-Field-Ionization Collisional Soft X-Ray Laser at 32.8 nm." Physical Review Letters, vol. 89, No. 25, pp. 253901-1-253901-4, The American Physiclal Society (Dec. 16, 2002).

K.A. Jenulewicz et al., "Saturated Ni-like Ag x-ray laser at 13.9 nm pumped by a single picosecond laser pulse." Physical Review A 68, 051802 (R), The American Physiclal Society (2003).

A. Butler et al., 41.8-nm $Xe^{8+}$laser driven in a plasma waveguide. Physical Review A 70, 02382, The American Physiclal Society (2004).

J.J. Rocca et al., "Energy Extraction and Achievement of the Saturation Limit in a Discharge-Pumped Table-Top Soft X-Ray Amplifier." Physical Review Letters vol. 77, No. 8, pp. 1476-1479, The American Physiclal Society (Aug. 19, 1996).

B.R. Benware et al., "Demonstration of a High Average Power Tabletop Soft X-Ray Laser." Physical Review Letters, vol. 81, No. 26, pp. 5804-5807, The American Physiclal Society (Dec. 28, 1998).

C.D. Macchietto et al., "Generation of millijoule-level soft-x-ray laser pulses at a 4-Hz repetition rate in a highly saturated tabletop capillary discharge amplifier." Optics Letters, vol. 24, No. 16, pp. 1115-1117, Optical Society of America (Aug. 15, 1999).

A. Ben-Kish et al., "Plasma Dynamics in Capillary Discharge Soft X-Ray Lasers." Physical Review Letters, vol. 87, No. 1, pp. 15002-1-015002-4, The American Physiclal Society (Jul. 2, 2001).

A. Ritucci et al., "Investigation of a highly saturated soft X-ray amplification In a capillary discharge plasma waveguide." Applied Physics B—Lasers and Optics 78, 965-969 (2004).

J. Filevich et al., "Dense plasma diagnostics with an amplitude-division soft-x-ray laser interferometer based on diffraction gratings." Optics Letters, vol. 25, No. 5, pp. 356-358. Optical Society of America (Mar. 1, 2000).

A. Artioukov et al., "Determination of XUV Optical Constants by Reflectometry Using a High-Repetition Rate 46.9-nm Laser." IEEE Journal of Selected Topics in Quantum Electronics, vol. 5, No. 6, pp. 1495-1501. (Nov./Dec. 1999).

B.R. Benware et al., "Focusing of a tabletop soft-x-ray laser beam and laser ablation." Optics Letters, vol. 24, No. 23, pp. 1714-1716, Optical Society of America (Dec. 1, 1999).

M. Seminario et al., "Characterization of diffraction gratings by use of a tabletop soft-x-ray laser." Applied Optics, vol. 40, No. 30, pp. 5539-5544, Optical Society of America (Oct. 20, 2001).

G. Tomassetti et al., "High-resolution imaging of a sfot-x-ray laser beam by color centers excitation in lithium fluoride crystals." Europhysics Letters, vol. 63, No. 5, pp. 681-686 (Sep. 1, 2003).

B. Luther et al., "Femtosecond laser triggering of a sub-100 picosecond jitter high-voltage spark gap." Applied Physics Letters, vol. 79, No. 20, pp. 3248-3250, American Institute of Physics (Nov. 12, 2001).

M. Frati et al., "Demonstration of a 10-uJ tabletop laser at 52.9 nm in neonlike chlorine." Optics Letters, vol. 25, No. 14, pp. 1022-1024, Optical Society of America (Jul. 15, 2000).

F.G. Tomasel et al., "Lasing at 60.8 nm in Ne-like sulfur ions in ablated material excited by a capillary discharge." Physical Review A, vol. 55, No. 2, pp. 1437-1440, The American Physical Society (Feb. 1997).

C.H. Moreno et al., "Two-dimensional near-field and far-field imaging of a Ne-like Ar capillary discharge table-top soft-x-ray laser." Physical Review A, vol. 58, No. 2, pp. 1509-1514, The American Physical Society (Aug. 1998).

Juan L. A. Chilla and Jorge J. Rocca, "Beam optics of gain-guided soft-x-ray lasers in cylindrical plasmas." Journal of the Optical Society of America B, vol. 13, No. 12, pp. 2841-2851, Optical Society of American (Dec. 1996).

S. Le Pape et al., "Electromagnetic-Field Distribution Measurements in the Soft X-Ray Range: Full Characterization of a Soft X-Ray Laser Beam." Physical Review Letters, vol. 88, No. 18, pp. 183901-1-183901-3, The American Physical Society (May 6, 2002).

\* cited by examiner

CAPILLARY DISCHARGE X-RAY LASER

STATEMENT REGARDING FEDERAL RIGHTS

This invention was made in part with government support from the National Science Foundation Center for Extreme Ultraviolet Science and Technology under NSF Award Number EEC-0310717. The government has certain rights in the invention.

FIELD OF THE INVENTION

The present invention relates generally to an efficient source of extreme ultraviolet/soft x-ray laser radiation having increased simplicity and reduced size, driven by a electrical discharge powered by a solid dielectric energy storage medium.

BACKGROUND OF THE INVENTION

Radiation in the extreme ultraviolet (EUV) and soft x-ray (SXR) regions of the electromagnetic spectrum finds use in applications that cannot be performed using visible light, such as imaging and printing of small features, diagnosis of dense large-scale plasmas, and the study of material surfaces by interaction with inner-shell electrons, to name a few. Many of these applications (for example, high-precision measurement techniques based on interferometry) further require radiation having substantial coherence which both allows radiation waves to interfere, and allows radiation to be focused onto small areas, thereby permitting high intensities to be achieved.

Synchrotron sources, high-order harmonic sources, and soft x-ray lasers have been used for generating coherent EUV/SXR radiation. Synchrotrons produce high average powers of EUV/SXR radiation that can be filtered in space and frequency to obtain a substantial coherence. Typically, these sources are multi-user facilities requiring their own buildings and costing hundreds of millions of dollars.

Direct amplification of EUV/SXR radiation in a suitable laser medium is an attractive method for generating intense beams of such radiation from a compact device. However, in order for a laser to operate efficiently and to produce significant amounts of laser output energy, the amplified beam must reach saturation intensity, whereby the amplified radiation extracts the majority of the energy stored in the population inversion. An obstacle for the development of such saturated lasers has been the large excitation power required to produce a sufficiently large population inversion in a volume having sufficient length. Successfully demonstrated EUV/SXR laser media include plasmas sustained using a powerful source of energy; for example, by focusing a high-power infrared, visible or ultraviolet laser radiation into the lasing media. Electrical energy is used to excite such a laser. To date, most saturated EUV/SXR lasers excited by this method have required large and costly pump lasers. In all cases average power output is low.

An alternative excitation method uses an electrical discharge as the energy source, thereby creating a plasma and exciting the laser upper level. In U.S. Pat. No. 4,937,832 which issued to Jorge J. Rocca on. Jun. 26, 1990, an electrical discharge through a capillary channel was demonstrated to produce a plasma column in which large EUV/SXR laser amplification was obtained. The lasing portion of the apparatus occupied a volume of about 1 m×1 m×2.5 m.

A liquid-dielectric (de-ionized water or ethylene glycol, as examples), high-voltage capacitor was charged to a chosen high voltage, and discharged through the capillary channel. A high-voltage Marx generator which included a voltage multiplication circuit having at least two series connected stages, each stage containing a capacitor and a high-voltage switch, was used. The capacitors were charged in parallel to a selected voltage using a high-voltage power supply, while the switches remained open. When the switches are simultaneously closed, a voltage that is of the order of the charging voltage times the number of stages is produced. A more compact configuration was achieved by replacing the liquid dielectric capacitor with a liquid-dielectric Blumlein transmission line. This latter device occupied a volume of about 0.4 m×0.4 m×1 m, a significant reduction in size respect to laser-excited EUV/SXR lasers. A Marx generator (typical volume of about 1 $m^3$), which includes a de-ionizing unit for achieving and maintaining sufficiently high resistivity for the liquid dielectric is generally still required.

Significant efforts have been devoted to reducing the size of saturated soft x-ray lasers from laboratory size [See, e.g., B. J. MacGowan et al., Phys. Fluids B 4, 2326, (1992); and A. Carrillon et al., Phys. Rev. Lett. 68, 2917, (1992)], to table-top size [See, e.g., J. J. Rocca et al., Phys. Rev. Lett. 73, 2192 (1994); J. Dunn et al., Phys. Rev. Lett. 84, 4834 (2000); S. Sebban, et al., Phys. Rev. Lett. 86, 3004 (2001); S. Sebban et al., Phys. Rev. Lett. 89, 253901 (2002); K. A. Jenulewicz et al., Phys. Rev. A 68, 051802 (2003); and A. Butler et al., Phys. Rev. A 70, 023821 (2004).]. The demonstration of laser amplification in transitions of Ne-like ions in a capillary discharge plasma [See, e.g., J. J. Rocca et al., Phys. Rev. Lett. 73, 2192 (1994); and J. J. Rocca et al., Phys. Rev. Lett. 77, 1476 (1996).] has led to the development of compact, short-wavelength lasers. Table-top size Ne-like Ar lasers operating at a wavelength of 46.9 nm have been developed making using water capacitors charged to high voltage (200-700 kV) from the pulsed output of Marx generators [See, e.g., J. J. Rocca et al., Phys. Rev. Lett. 77, 1476 (1996); B. R. Benware et al., Phys. Rev. Lett. 81, 5804 (1998); C. D. Machietto et al., Optics Lett. 24, 1115 (1999); A. Ben-Kish et al., Phys. Rev. Lett. 87, 1 (2001); and A. Ritucci et al., Applied Phys. B 78, 965 (2004).].

Such lasers have been used in numerous applications, including interferometry of dense plasmas [See, e.g., J. Filevich et al., Optics Lett. 25, 356 (2000).], the measurement of optical constants [See, e.g., A. Artioukov et al., IEEE J. of Selected Topics in Quant. Elec. 5, 1495 (1999).], materials ablation [See, e.g., B. R. Benware et al., Optics Lett. 24, 1714 (1999).], the characterization of soft x-ray optics [See, e.g., M. Seminario et al., Appl. Optics 40, 5539 (2001).], excitation of color centers in crystals [See, e.g., G. Tomassetti et al., Europhys. Lett. 63, 681 (2003).], nanopatterning [See, e.g., M. G. Capeluto et al. (submitted to IEEE Transaction on Nanotechnology).], photochemistry, and high resolution imaging.

Accordingly, it is an object of the present invention to provide coherent EUV/SXR radiation from a compact, high average power laser.

Another object of the present invention is to provide coherent EUV/SXR radiation at sufficiently low applied voltages that a Marx generator is not required.

Still another object of the present invention is to provide coherent EUV/SXR radiation at high repetition rates, and high average power.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the pulsed x-ray laser hereof includes: A pulsed x-ray laser comprising in combination: a capillary tube having a chosen length and a chosen bore, the capillary tube having a first end and a second end; an electrode disposed in the vicinity of the first end of the capillary tube; an electrode in electrical connection with ground potential disposed in the vicinity of the second end of the capillary tube and having an opening adapted so as not to occlude the bore thereof; means for introducing a chosen gas into the bore of the capillary tube; means for preionizing the gas; at least one capacitor having a chosen capacitance and having a first electrode and a second electrode, the first electrode of the at least one capacitor being in electrical contact with ground potential; means for charging the at least one capacitor through the second electrode thereof to a chosen voltage such that an electrical discharge occurs in the gas between the electrode disposed in the vicinity of the first end of said capillary tube and the ground electrode thereof when the gas is preionized, the discharge having a current effective for generating a population inversion in the preionized gas suitable for producing lasing therein; and means for enclosing the capillary tube, the enclosing means being in electrical connection with the grounded electrode, and being adapted such that the return path of the discharge current to ground potential is minimized.

In another aspect of the present invention and in accordance with its objects and purposes, the method for generating pulsed x-ray laser radiation in a capillary discharge hereof includes the steps of: introducing a chosen gas into a capillary tube having a chosen diameter, an electrode disposed in the vicinity of a first end, and an electrode in electrical connection with ground potential disposed in the vicinity of a second end, the grounded electrode having an opening adapted so as not to occlude the bore of the capillary tube, the capillary tube being enclosed by an electrically conductive material in electrical contact with the grounded electrode, such that the return path of discharge current to ground is minimized; charging at least one capacitor having a chosen capacitance a first electrode and a second electrode, the first electrode being in electrical contact with ground potential, to a chosen voltage through the second electrode thereof, such that an electrical discharge occurs in the gas between the electrode disposed in the vicinity of the first end of the capillary tube and the ground electrode thereof when the gas is preionized, the discharge having a current effective for generating a population inversion in the preionized gas suitable for producing lasing therein; and preionizing the chosen gas.

Benefits and advantages of the present method include a reliable, portable, compact EUV/SXR laser capable of operating at modest voltages, typically less than about 100 kilovolts, without the necessity of a Marx generator and an accompanying water de-ionizing unit, while exceeding the saturation intensity of the laser media, thereby allowing high peak-power laser beam generation and efficient laser operation.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1A:
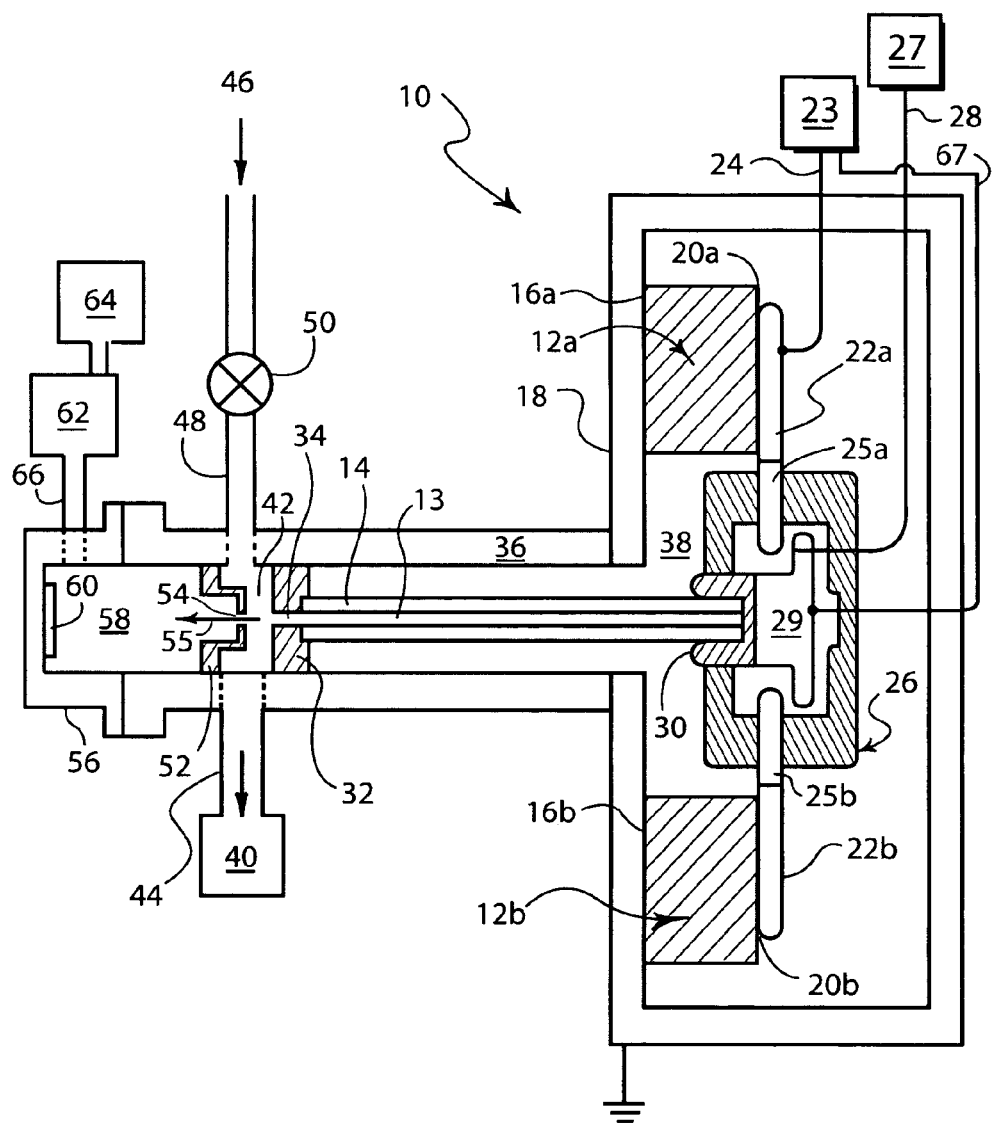
FIG. 1A is a schematic representation of a cross section of one embodiment of the electric discharge-excited EUV/SXR laser of the present invention.

Briefly, the present invention includes an apparatus and method for generating laser radiation in the extreme ultraviolet (EUV) electromagnetic spectral region (defined for the purposes hereof as the spectral region corresponding to wavelengths between about 55 nm and 150 nm) and in a portion of the soft x-ray (SXR) electromagnetic spectral region (defined for the purposes hereof as the spectral region between about 1 nm and 55 nm). Low-inductance electrical components suitable for generating an electric discharge in a capillary tube containing the lasing medium and providing excitation thereto are employed. Solid dielectric capacitors (typically a ceramic or another type of solid insulator) are pulse charged using electrical circuitry described hereinbelow, and commercially available high-voltage power supplies and pulse generators, to provide fast electrical current pulses through the capillary structure. The apparatus does not require the Marx generator and the accompanying, generally required water de-ionizer utilized in earlier apparatus, and can generate plasma columns having sufficient length to produce a saturated laser beam, while fitting on a small desk.

The capillary tube includes an elongated hollow structure having a large length-to-diameter ratio and insulating walls that include at least two conducting electrodes for injecting fast current pulse into the capillary channel. At least one of these electrodes is adapted to permit laser radiation and gases to exit the capillary structure. The lasing material is introduced into the capillary in the form of a gas or a vapor, and may be flowed therethrough. The current pulse is provided by at least one charged, solid-dielectric capacitor or a transmission line. An electrical switch is used for rapidly directing the high voltage from the capacitor or transmission line to the capillary channel.

The lasing material is preionized to create a uniform axial plasma throughout the capillary channel prior to the arrival of the high-energy, fast high-current pulse. At least one reflecting mirror can be aligned with the axis of the capillary structure to permit more than one pass of the laser radiation through the capillary structure, thereby increasing the laser output energy. Additional capillary channels placed in tandem may be used to further increase laser output energy; that is, laser radiation exiting one of the capillaries would be injected into and along the axis of another capillary.

As stated hereinabove, larger-size, Ne-like Ar 46.9 nm capillary-discharge lasers have been previously demonstrated [J. J. Rocca et al., Phys. Rev. Lett. 73, 2192 (1994), supra; J. J. Rocca et al. Phys. Rev. Lett. 77, 1476 (1996), supra; B. R. Benware et al., Rocca, Phys. Rev. Lett. 81, 5804 (1998), supra; C. D. Machietto et al., Optics Lett. 24, 1115 (1999), supra; A. Ben-Kish et al., Phys. Rev. Lett. 87, 1 (2001), supra; and A. Ritucci et al., Applied Phys. B 78, 965 (2004), supra.]. Laser amplification in the present invention is generated by fast discharge excitation of a preionized Ar-filled capillary wherein the length-to-diameter ratio of the lasing plasma column is about 1000. As understood by the inventor, the magnetic force of the current pulse and large thermal pressure gradients near the capillary wall rapidly compress the plasma to form a dense, hot column having a large density of Ne-like ions, a substantial axial uniformity. Collisional electron impact excitation of the ground state Ne-like ions produces a population inversion between the $3p\ ^1S_0$ and $3s\ ^1P_1$ levels resulting in amplification at 46.9 nm [J. J. Rocca et al., Phys. Rev. Lett. 73, 2192 (1994), supra.].

The present laser was found to emit>10 µJ pulses at approximately λ=46.9 nm at an about 12 Hz repetition rate with argon gas as the lasing medium, and occupies a table area of approximately 0.4 m×0.4 m (0.4 m×0.8 m with the vacuum pump included), which is smaller than that occupied by many widely used ultraviolet gas lasers. The reduced size of the present capillary discharge device is achieved by utilizing a low-inductance, coaxial-discharge configuration that substantially decreases the voltage necessary to generate the peak current required for laser excitation. That is, excitation of the capillary discharge channel utilizes ceramic capacitors which are pulse charged to voltages <90 kV. This reduced voltage permits the use of readily available high voltage power supplies. In actuality, because of the pulse charging procedure, dc voltages of about 65 kV are employed to generate the approximately 90 kV pulsed applied voltage. Consequently, the volume of the pulsed power unit is about 1/9 as large as that of previous capillary discharge lasers [B. R. Benware et al., Rocca, Phys. Rev. Lett. 81, 5804 (1998), supra.] and can be accommodated in a small rack under a regular optical table.

Reference will now be made in detail to the present preferred embodiments of the invention examples of which are illustrated in the accompanying drawings. Turning now to FIG. 1A hereof, schematic representation of one embodiment of the EUV/SXR laser, 10, of the present invention is illustrated which has been successfully tested. In one embodiment of the invention, at least one charged, ceramic capacitor, (shown as two capacitors 12a and 12b), disposed such that the overall inductance is minimized, is discharged through bore, 13, of capillary, 14. One electrical contact, 16a (16b), of capacitor 12a (12b) is placed in electrical connection to grounded, electrical conductor, 18, which forms part of an enclosure for the electrical components, while the other output thereof, 20a (20b), is placed in electrical connection with electrical conductor, 22a (22b). Conductors 18 and 22 may be fabricated from metal, such as aluminum, brass or stainless steel. Conductor 22a (22b) is pulse charged using pulsed, high-voltage pulsed power source, 23 (not shown connected to conductor 22b), in electrical connection therewith through cable, 24. Conductor 22a (22b) is also placed in electrical connection with electrode, 25a (25b), of high-voltage switch, 26, which for the embodiment tested, was a triggerable high-voltage, gas-filled spark gap switch. When capacitors 12a and 12b are charged to sufficiently high voltage (depending on the characteristics of gas-filled spark gap switch 26), the gas in spark-gap 26 will break down. Gas breakdown can also be achieved as the result of the arrival of an external trigger pulse from pulse source, 27, to be described hereinbelow. The charge stored in capacitors 12a and 12b flows through capillary bore 13, thereby generating a fast excitation, high-current pulse.

Electrode, 29, of spark gap 26 is electrically connected to electrode, 30, which substantially surrounds one end of capillary tube 14. A second electrode, 32, substantially surrounds the other end of the capillary. Electrode 32 has an orifice, 34, along the longitudinal axis of bore 13 of capillary 14 to allow the exit of laser radiation which may be detected and/or directed to its intended application. In the situation where more than one capillary structure is used, electrode 30 would similarly be provided with an orifice located in line with bore 13 of the capillary. In such situation, the lasing gas or vapor could be introduced into either end of capillary 14. Additionally, such gas or vapor could be flowed through capillary bore 13. Stainless steel has been effectively used for electrodes 30 and 32; however, other metals may be used. In situations where it is desirable to minimize electrode erosion due to electron bombardment, molybdenum or other refractory metals might be employed.

Capillary 14 was fabricated from aluminum oxide (high purity alumina) in the embodiment tested, but other materials can be used, such as diamond-coated ceramics, other ceramics, and sapphire, as examples. Cylindrical conducting metallic tube, 36, closely surrounds capillary 14, and is in electrical connection with grounded electrode 32 to provide a current return path. The close proximity of the metallic tube to the capillary tube permits the minimization of the volume enclosed by the return discharge current path, thereby reducing the inductance of the discharge apparatus, and permitting lower voltages to be used to generate an effective gas discharge. Together with grounded metallic enclosure 18, tube 36 forms a sealed enclosure for EUV/SXR laser 10 of the present invention. The enclosure substantially shields the electromagnetic noise produced by the fast discharge.

Capillary 14, capacitors 12a and 12b, and spark gap 26 are immersed in a high dielectric strength fluid, 38, such as transformer oil which provides voltage isolation and thermal cooling. The high dielectric strength of this fluid permits the diameter of tube 36 to be made sufficiently small that the inductance of the discharge apparatus is minimized. Other desirable characteristics of such fluids include high heat conductivity and high decomposition temperature. The transformer oil was circulated using a commercially available chiller unit (not shown in FIG. 1).

Capillary tube 14 is evacuated through orifice 34 in electrode 32, using roughing vacuum pump, 40, which is connected to volume 42, through tube, 44. Gaseous lasing materials, 46, are introduced into volume 42 and bore 13 through tube, 48, using needle valve, 50, to regulate the gas pressure and flow rate. For argon, filling pressures between 0.1 to 1 Torr were found to be effective, depending on the capillary diameter. The lasing gas was not flowed through the capillary bore; however, it is anticipated that "gas renewal" in the capillary would be beneficial for high repetition-rate operation of laser 10, subject to the constraint that the pressure must remain approximately constant along capillary bore 13. In order to reduce absorption of output laser radiation by the chosen gas, volume 42 was kept small by means of insert, 52, having hole, 54, which permits passage of EUV/SXR radiation, 55.

Pressures below about $1 \times 10^{-4}$ Torr were maintained in chamber, 56, to permit radiation propagation with low attenuation through volume, 58, to target, 60. Target 60 may include a radiation detector or a material to be irradiated, as examples. Such pressures are readily attainable by differential pumping using turbomolecular pump, 62, backed by mechanical pump, 64, through tube, 66, and are effective for the operation of laser 10. Before filling, the apparatus was pumped to a vacuum of approximately $1 \times 10^{-5}$ Torr.

High-voltage pulsed power source, 23, also provides a preionization current to the gases contained in bore 13 of capillary 14 through cable 67. A combination of a DC current between about 50 and 100 mA followed by a smooth current "ramp" of about 1 μs-duration pre-pulse prior to the firing of the short time duration, high-current discharge pulse. Larger values for the DC preionization current can be used, but heat dissipation may become a problem. The short time duration, high-current pulse ionizes and excites the plasma, creating a population inversion by collisional electron impact excitation. Radiation spontaneously emitted by the excited laser medium is amplified to form a directed high power laser beam. Pinhole, 54, having a chosen diameter (about 1 mm for the lasing apparatus described), is placed in close proximity to electrode 32, in order to achieve a short optical path for laser radiation 55 between exit 34 of electrode 32 and volume 58, thereby reducing absorption of the laser radiation by photoionization of the residual gases.

Length-to-bore diameter ratios between about 20 and 1000 are suitable for capillary 14, with bore 13 diameters ranging between 0.5 mm and 10 mm. Diameters between about 1.5 mm and 6 mm have been observed to provide the best results. The length of the lasing channel is selected to be sufficiently long for the laser intensity to reach the value at which the amplification saturates due to depletion of the population inversion. For example, in the case of operation with Ar gas as the lasing medium, (46.9 nm laser radiation) a capillary channel length of between about 15 cm and 20 cm was found to produce saturated amplification. Capillaries between about 10 cm and 40 cm are expected to generate efficient laser operation. Operation using shorter capillary lengths, for example 11 cm, is readily implemented, but laser output efficiency will be reduced. Thus, in general, laser output efficiency (defined as the ratio between the laser output energy and the excitation energy) will also significantly decrease if the capillary length is reduced below that required to reach saturation.

In actual operation, laser amplification was obtained in a Ne-like Ar plasma column generated in aluminum-oxide capillary 14 having a 3.2 mm inside diameter and a 21 cm length and filled with pre-ionized Ar at a pressure of about 700 mTorr. The plasma column was excited by current pulses of about 22 kA peak amplitude monitored with a Rogowski coil (not shown in FIG. 1). The excitation current pulse was produced by discharging ceramic capacitors 12 having a combined capacitance of 27 nF through pressurized air, high-voltage spark-gap switch 26 that was connected in series with the capillary. Capacitors 12, were placed in a ring configuration surrounding the spark-gap, and pulse-charged to 80-90 kV by single-stage, pulsed power unit 23 connected to the capacitors using coaxial cable 24. This configuration further reduces the discharge current return pathway to ground, thereby further reducing the inductance of the discharge apparatus and permitting lower charging voltages to be employed. It should be mentioned that ring-shaped capacitors having an axis approximately collinear with the bore of the capillary tube may also be used. The main current pulse through the capillary was initiated by triggering the spark-gap 26 with an approximately 50 kV pulse of opposite polarity to that used to charge the capacitors provided by pulse generator 27 through cable, 67. Synchronization of the laser output with external events was observed to have a jitter of several nanoseconds. Sub-nanosecond jitter can be obtained using laser triggering of the spark-gap [See, e.g., B. Luther et al., Appl. Phys. Lett. 79, 3248-3250 (2001).].

Figure 1B:
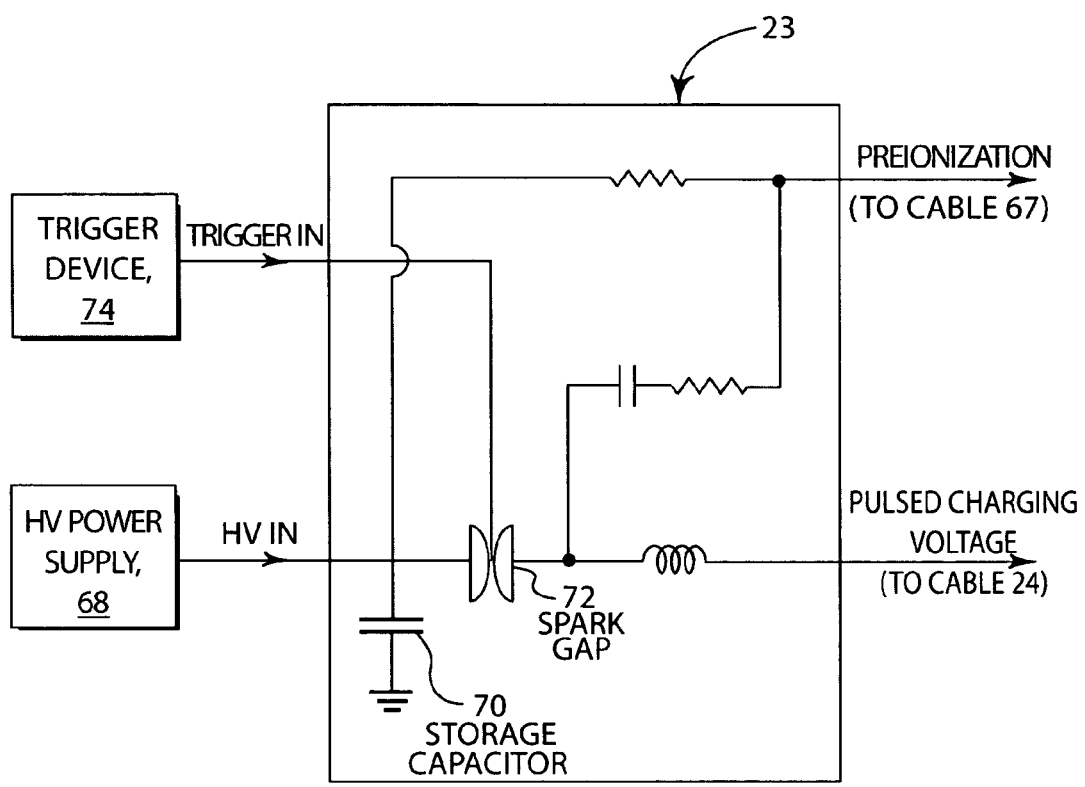
FIG. 1B is a schematic representation of the apparatus for producing voltages for preionizing the chosen laser gas and for pulse charging the capacitors which provide the high-current electric discharge to the preionized gas.

FIG. 1B shows a schematic representation of the components of high-voltage pulsed power source 23. Commercial, high-voltage power supply, 68, supplies high voltage effective for preionizing the laser gas and for charging capacitor, 70, which when switched through spark gap, 72, by voltage trigger device, 74, provides pulse charging to capacitors 12a and 12b. As stated hereinabove, voltages of about 65 kV generate the approximately 90 kV pulsed charging voltage.

Figure 1C:
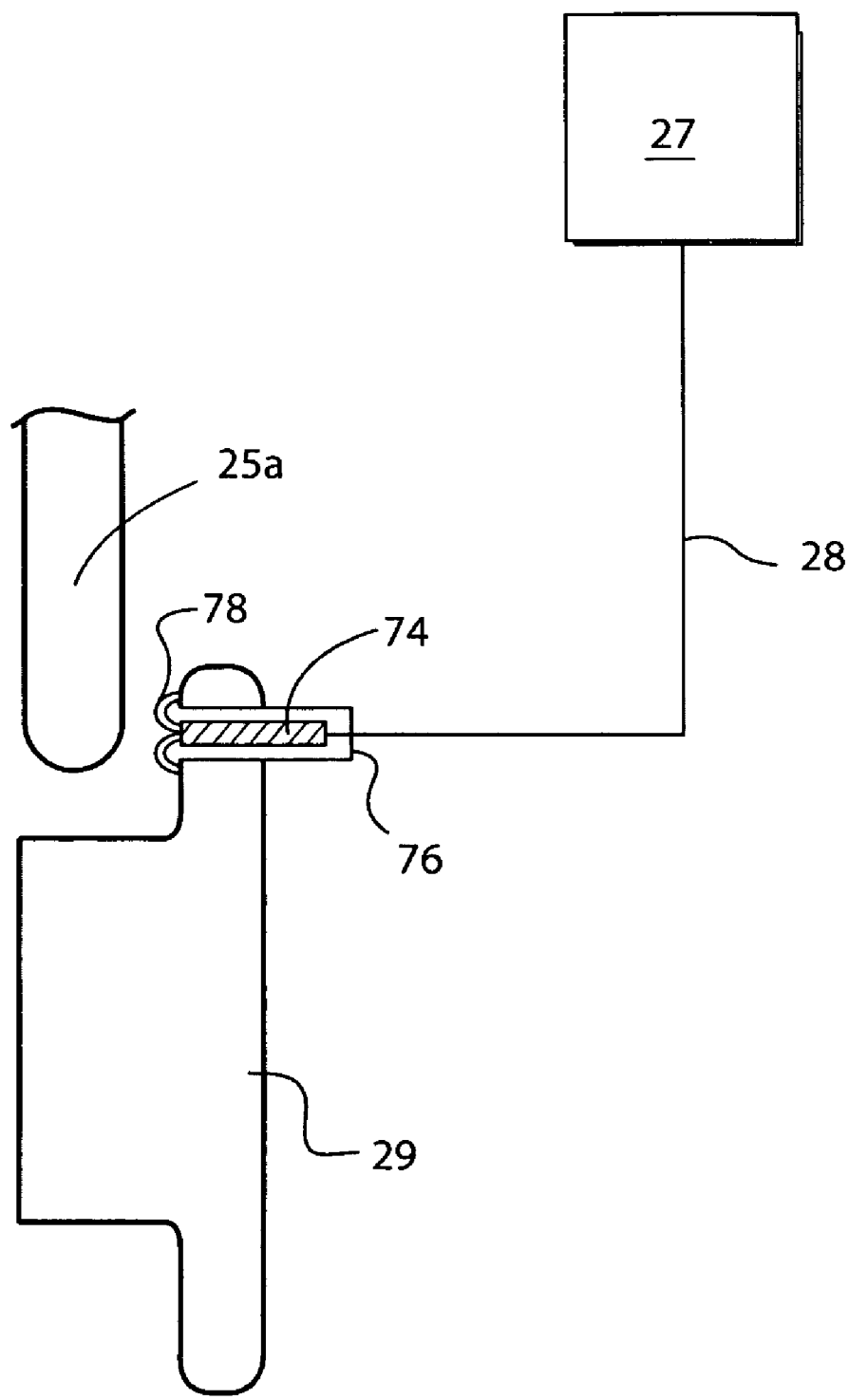
FIG. 1C is a schematic representation of an exploded view of the electrodes for the triggered spark gap.

FIG. 1C shows an exploded schematic representation of electrode 29 of spark gap 26, showing, in particular, insulating material, 76, which is inserted through a hole in electrode 29, and conductor, 74, which breaks down, 78, to electrode 29 when a trigger voltage from pulsed high-voltage source 27 is directed through cable 28, thereby permitting the short-duration, high current pulse to pass between electrode 25a and electrode 29.

Although laser 10, has been demonstrated using argon, with lasing taking place at 46.9 nm, other gases, metal vapors and mixtures of gases may be used. Lasing using chlorine gas at 52.9 nm in the present apparatus is expected [See, e.g., M. Frati et al., "Demonstration of a 10 μJ tabletop laser at 52.9 nm in neon-like chlorine", Optics Lett. 25, 1022 (2000)]. Using a different (and larger) capillary discharge laser, lasing in Sulfur at 60.8 nm was demonstrated [See, e.g., F. G. Tomasel et al., "Lasing at 60.8 nm in Ne-like Sulfur Ions in Ablated Material Excited by a Capillary Discharge" Phys. Rev. A 55, 1437 (1997)]. The lasing material can also be generated within the bore as a result of ablation from the capillary walls.

Figure 2:
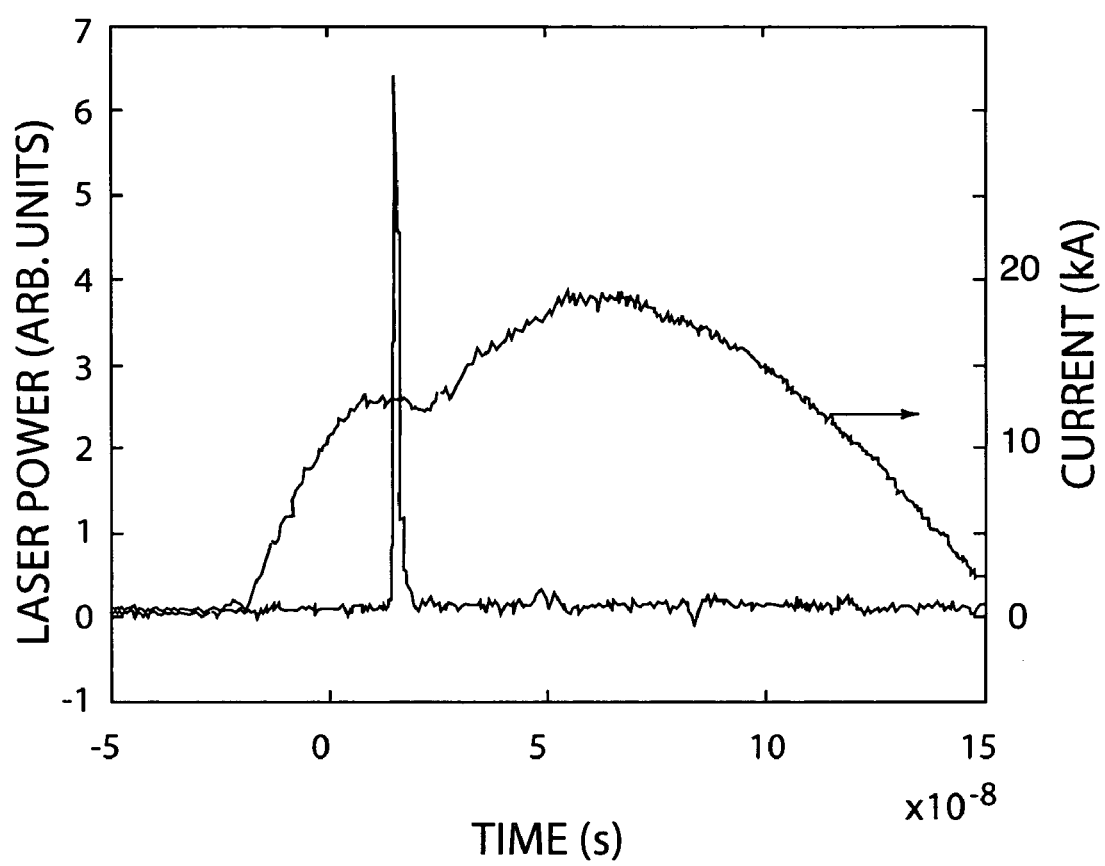
FIG. 2 is an oscilloscope trace of the output of the laser (lower trace) detected using a vacuum photodiode, and the corresponding current pulse from the electrical discharge apparatus (upper trace) described in FIG. 1 hereof; the dip in the current trace is caused by the abrupt increase of the plasma column inductance at the time of the pinch.

FIG. 2 shows oscilloscope traces of the approximately 13 μJ laser output pulse having a duration of approximately 1 ns, and the excitation current pulse accompanying laser operation. The pulse has 10% to 90% rise time of approximately 60 ns, and a first half-cycle duration of 165 ns. A pronounced dip may be observed in the current about 40 ns after the beginning of the current pulse. This local minimum of the current occurs at the time the plasma column reaches its minimum diameter of 200-300 μm, and is believed by the inventor to be caused by the significant increase in the plasma column inductance that accompanies the reduction of the plasma column diameter. The resulting laser pulse of 1.5 ns FWHM duration may be seen to occur shortly before the time of maximum plasma compression, which takes place about 35 ns after the initiation of the current pulse.

Figure 3:
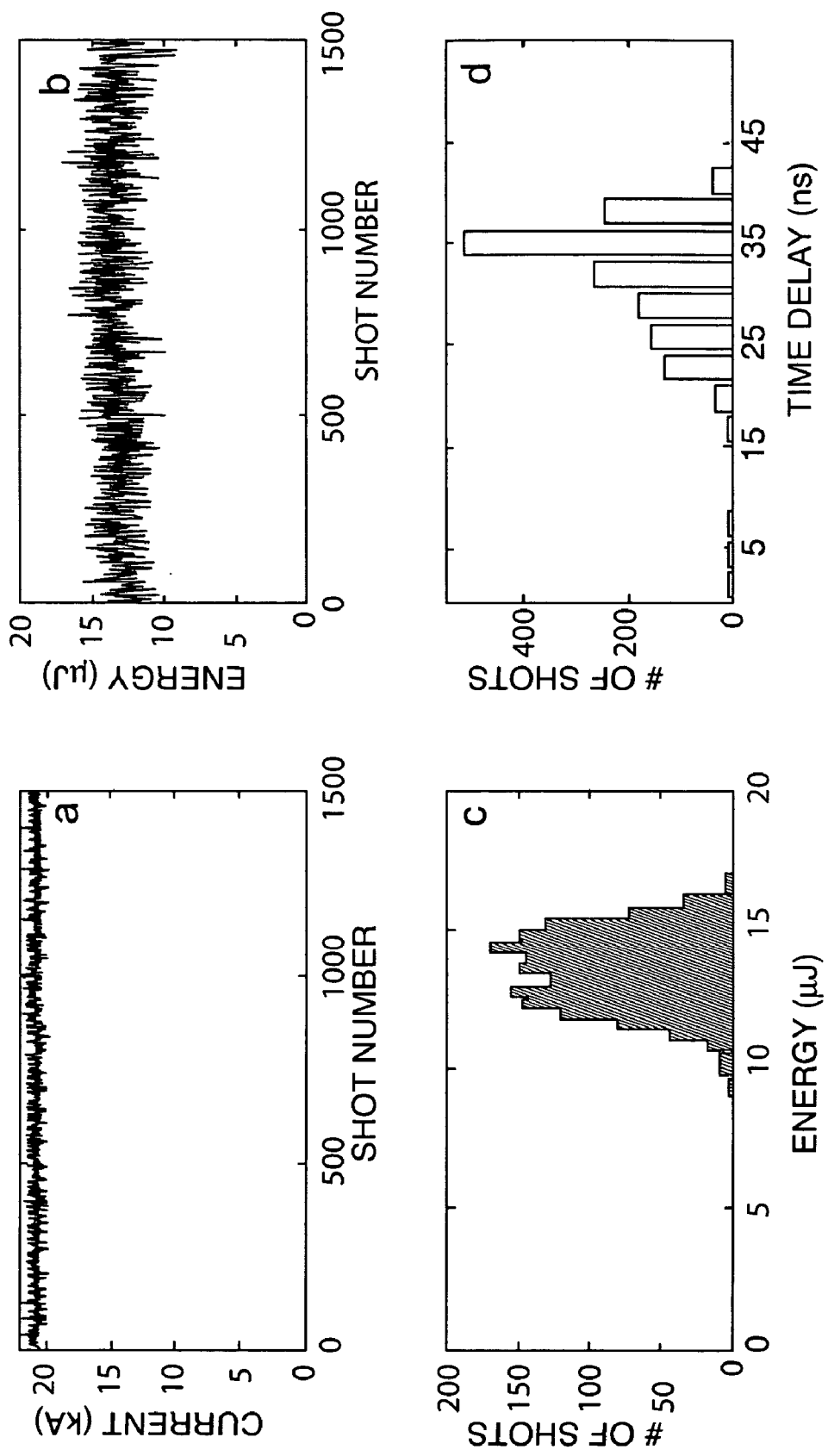
FIG. 3 shows data for 1500 shots of continuous operation at 12 Hz repetition rate, where (a) is the peak current; (b) is the measured laser output pulse energy (average pulse energy of 13 µJ±1.3 µJ); (c) is the distribution of the laser output pulse energy; and (d) are the time delay statistics of the laser pulse respect to transistor-transistor logic (TTL) signal driving the high voltage trigger unit.

The laser output pulse energy was measured using a vacuum photodiode placed at 80 cm from the exit of the laser and the data were recorded and stored by a 5 Gs/s digitizing oscilloscope. The quantum efficiency of the Al photocathode used was previously calibrated with respect to a silicon photodiode of known quantum yield [J. J. Rocca et al. Phys. Rev. Lett. 77, 1476 (1996), supra.]. The laser output was attenuated with several stainless steel meshes of measured transmissivity to avoid saturation of the photodiode. The laser was successfully operated at repetition rates up to 12 Hz. FIG. 3a shows the shot to shot variation of the peak of the excitation current pulse for 1500 consecutive shots at 12 Hz repetition rate. FIG. 3b and FIG. 3c illustrate the corresponding shot-to-shot variation of the laser output pulse energy as a function of the shot number and its statistical distribution respectively. The average pulse energy was 13 μJ and the standard deviation is ±1.3 μJ, which corresponds to an average power of about 0.15 mW. The use of external triggering of the spark-gap permitted relatively low jitter operation. FIG. 3d illustrates the statistical distribution of the time delay between the TTL trigger signal into the high voltage trigger device that fires the spark-gap and the laser output pulse for the 1500 laser shots of FIG. 3a. The standard deviation of the jitter is ±5 ns.

Figure 4:
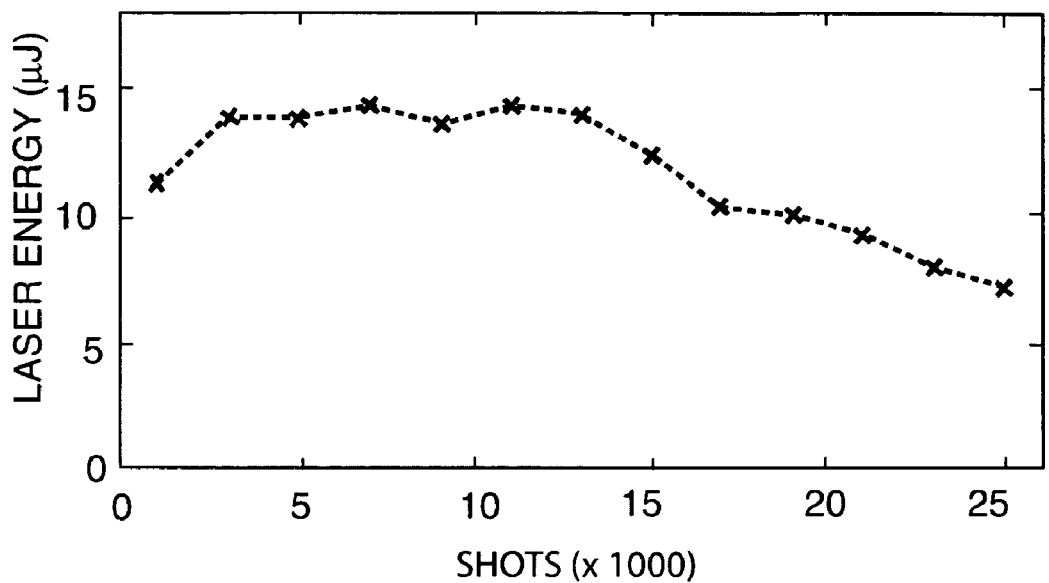
FIG. 4 is a graph of the laser output pulse energy as a function of the number of shots, obtained at a 12 Hz laser repetition rate (the output energy is seen to degrade to about ½ of its maximum value in between 2 and $3 \times 10^4$ pulses).

Ablation of the capillary walls by the discharge over a large number of shots was observed to increase their surface roughness, ultimately leading to the deterioration of the uniformity of the plasma column and to a consequent decrease of the laser output energy. Capillary lifetime tests were conducted at 12 Hz repetition rate by recording the laser output energy for a large number of pulses. The laser output energy was observed to decay by a factor of about 2 after between approximately 2 and $3 \times 10^4$ pulses as may be observed from FIG. 4 hereof. The full output pulse energy can be recovered by replacing the used capillary discharge tube by an unused tube.

The far field laser output intensity distribution was measured using a microchannel plate/phosphor screen read by a CCD array detector of 1024×1024 pixels placed at 157.5 cm from the exit of the laser. The microchannel plate was gated with an approximately 5 ns voltage pulse to enable the discrimination of the laser light from the spontaneous light emitted by the plasma in hundreds of extreme ultraviolet transitions that are several orders of magnitude less intense than the laser emission, and which produce a significant background when temporally integrated over the duration of the discharge. The beam profile was observed to have an annular shape that is the result of refraction of the amplified rays by radial electron density gradients in the plasma column [See, e.g., C. H. Moreno et al., Phys. Rev. A 58, 1509 (1998); and J. L. A. Chilla and J. J. Rocca, J. Opt. Soc. Am. B 13, 2841 (1996).].

Figure 5:
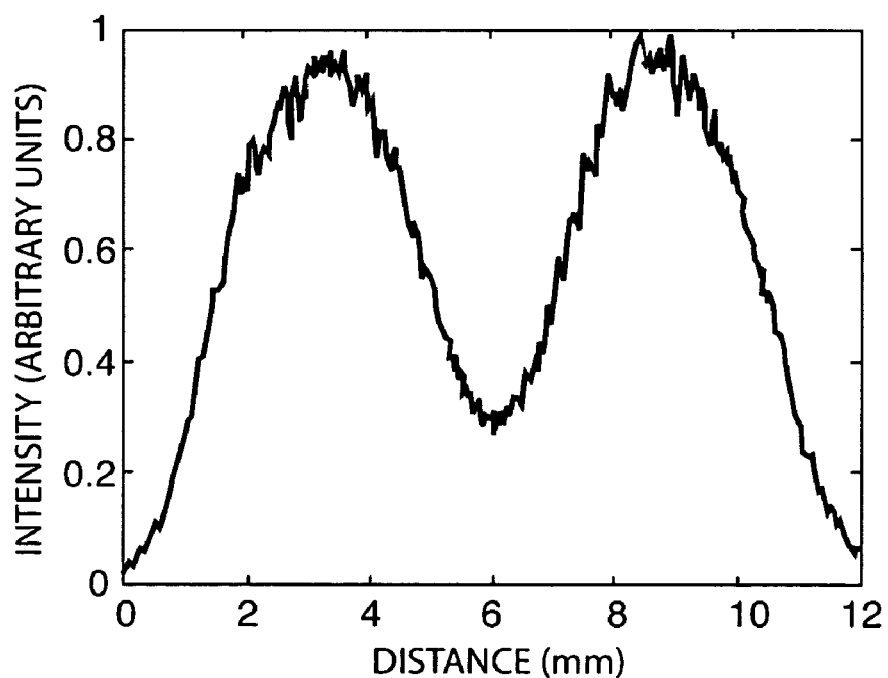
FIG. 5 is a graph of the far-field laser intensity across the laser output beam as measured at 157.5 cm from the exit of the capillary.

FIG. 5 shows a cross section of an output intensity pattern acquired in a single shot at 157.5 cm from the capillary exit. The peak-to-peak divergence was about 5.2 mrad. Although the wavefront has not yet been characterized, previous measurements of similar annular capillary discharge laser beams have shown good focusing properties [See, e.g., S. Le Pape et al., Phys. Rev. Lett. 88, 183901 (2002).].

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A pulsed x-ray laser comprising in combination:
   (a) a capillary tube having a chosen length and a bore having a chosen diameter, said capillary tube having a first end and a second end;
   (b) a first electrode disposed in the vicinity of the first end of said capillary tube;
   (c) a second electrode in electrical connection with ground potential disposed in the vicinity of the second end of said capillary tube and having an opening adapted so as not to occlude the bore of said capillary tube;
   (d) means for introducing a chosen gas into the bore of said capillary tube;
   (e) means for preionizing the gas;
   (f) at least one capacitor having a chosen capacitance, a third electrode and a fourth electrode, said third electrode being in electrical contact with ground potential;
   (g) means for charging said at least one capacitor to a chosen voltage through said fourth electrode, such that an electrical discharge occurs in the gas between said first electrode disposed in the vicinity of the first end of said capillary tube and said second electrode when the gas is preionized, the discharge having a current effective for generating a population inversion in the preionized gas suitable for producing lasing therein; and
   (h) means for enclosing said capillary tube, said enclosing means comprising an electrically conductive material in electrical contact with said second electrode, and being adapted such that the return path of the discharge current to ground potential is minimized.

2. The pulsed x-ray pulsed laser as described in claim 1, wherein said means for preionizing comprises a pulse generator.

3. The pulsed x-ray laser as described in claim 1, further comprising means for switching the voltage from said at least one capacitor onto said first electrode disposed in the vicinity of the first end of said capillary tube.

4. The pulsed x-ray laser as described in claim 3, wherein said means for switching the voltage from said at least one capacitor comprises a high-voltage switch.

5. The pulsed x-ray laser as described in claim 4, wherein said high-voltage switch comprises a gas-filled, triggerable spark gap.

6. The pulsed x-ray laser as described in claim 1, wherein said means for charging said at least one capacitor to a chosen voltage comprises pulse charging means.

7. The pulsed x-ray laser as described in claim 1, wherein said at least one capacitor comprises a ceramic capacitor.

8. The pulsed x-ray laser as described in claim 1, wherein said at least one capacitor comprises a cylindrical capacitor having an axis, the axis of said cylindrical capacitor being approximately collinear with the bore of said capillary tube.

9. The pulsed x-ray laser as described in claim 1, wherein the chosen gas is argon, and the laser radiation is approximately 46.9 nm.

10. The pulsed x-ray laser as described in claim 1, wherein said capillary tube comprises alumina.

11. The pulsed x-ray laser as described in claim 1, wherein said means for enclosing said capillary tube comprises: (a) a cylindrical tube having a chosen diameter and an axis approximately collinear with the bore of said capillary tube, an annular region being formed between said cylindrical tube and said capillary tube; and (b) a high dielectric breakdown material filling the annular region, whereby the return path of the discharge current to ground is minimized.

12. The pulsed x-ray laser as described in claim 11, wherein said high dielectric breakdown material comprises transformer oil.

13. The pulsed x-ray laser as described in claim 1, wherein said at least one capacitor is charged to at most 100 kV.

14. The pulsed x-ray laser as described in claim 1, wherein the bore diameter and the length of said capillary tube are chosen such that a saturated population inversion is generated in the argon lasing gas.

15. The pulsed x-ray laser as described in claim 1, wherein said at least one capacitor is arranged in a circular pattern having an axis approximately collinear with the bore of said capillary tube, whereby the return path of the discharge current to ground is minimized.

16. The pulsed x-ray laser as described in claim 1, wherein said at least one capacitor is surrounded by transformer oil.

17. A method for generating pulsed x-ray laser radiation in a capillary discharge, comprising the steps of:
 (a) introducing a chosen gas into a capillary tube having a chosen length and a bore having a chosen diameter, a first electrode disposed in the vicinity of a first end, and a second electrode in electrical connection with ground potential disposed in the vicinity of a second end, the second electrode having an opening adapted so as not to occlude the bore of the capillary tube, the capillary tube being enclosed by an electrically conductive material in electrical contact with the second electrode, such that the return path of the discharge current to ground potential is minimized;
 (b) charging at least one capacitor having a chosen capacitance, a third electrode and a fourth electrode, the third electrode being in electrical contact with ground potential, to a chosen voltage through the fourth electrode, such that an electrical discharge occurs in the gas between the first electrode disposed in the vicinity of the first end of the capillary tube and the second electrode when the gas is preionized, the discharge having a current effective for generating a population inversion in the preionized gas suitable for producing lasing therein; and
 (c) preionizing the chosen gas.

18. The method for generating pulsed x-ray laser radiation in a capillary discharge as described in claim 17, further comprising the step of switching the voltage from the at least one capacitor onto the first electrode disposed in the vicinity of the first end of the capillary tube.

19. The method for generating pulsed x-ray laser radiation in a capillary discharge pulsed x-ray laser as described in claim 18, wherein the step of switching the voltage is performed using a gas-filled, triggerable spark gap.

20. The method for generating pulsed x-ray laser radiation in a capillary discharge as described in claim 17, wherein said step of charging the at least one capacitor to a chosen voltage comprises pulse charging the at least one capacitor.

21. The method for generating pulsed x-ray laser radiation in a capillary discharge as described in claim 17, wherein the chosen gas is argon, and the laser radiation is approximately 46.9 nm.

22. The method for generating pulsed x-ray laser radiation in a capillary discharge as described in claim 17, wherein the capillary tube comprises alumina.

23. The method for generating pulsed x-ray laser radiation in a capillary discharge as described in claim 17, wherein the capillary tube enclosing material comprises: (a) a cylindrical electrically conductive metal tube having a chosen diameter and an axis approximately collinear with the bore of the capillary tube, an annular region being formed between the cylindrical tube and the capillary tube; and (b) a high dielectric breakdown material filling the annular region, whereby the return path of the discharge current to ground is minimized.

24. The method for generating pulsed x-ray laser radiation in a capillary discharge as described in claim 23, wherein the high dielectric breakdown material comprises transformer oil.

25. The method for generating pulsed x-ray laser radiation in a capillary discharge as described in claim 17, wherein the at least one capacitor is charged to at most 100 kV.

26. The method for generating pulsed x-ray laser radiation in a capillary discharge as described in claim 17, wherein the bore diameter and the length of the capillary tube are chosen such that a saturated population inversion is generated in the argon lasing gas.

27. The method for generating pulsed x-ray laser radiation in a capillary discharge as described in claim 17, wherein the at least one capacitor is arranged in a circular pattern having an axis approximately collinear with the bore of the capillary tube, whereby the return path of the discharge current to ground is minimized.

* * * * *